(12) United States Patent
Wu

(10) Patent No.: US 6,502,966 B1
(45) Date of Patent: Jan. 7, 2003

(54) CEILING LAMP JUNCTION BOX DOUBLE-CONSTRAINT LIGHTING ROD MOUNTING STRUCTURE

(76) Inventor: Wen-Chang Wu, No. 10, Lane 191, Hsi Hsin Street, Chuang Ya Tsun, Hsiu Shui Hsiang, Chang Hua Hsien (TW)

( * ) Notice: Subject to any disclaimer, the term of this patent is extended or adjusted under 35 U.S.C. 154(b) by 0 days.

(21) Appl. No.: 09/962,317

(22) Filed: Sep. 26, 2001

(51) Int. Cl.$^7$ .............................................. F21V 17/00
(52) U.S. Cl. ...................... 362/365; 362/147; 362/404; 362/581; 248/343; 248/906
(58) Field of Search ................................. 362/364, 365, 362/147, 145, 404, 581; 248/343, 906

(56) References Cited

U.S. PATENT DOCUMENTS

| | | | | |
|---|---|---|---|---|
| 4,607,317 | * | 8/1986 | Lin ............................. | 362/122 |
| 5,584,575 | * | 12/1996 | Fickel ......................... | 362/147 |

* cited by examiner

Primary Examiner—Sandra O'Shea
Assistant Examiner—John Anthony Ward
(74) Attorney, Agent, or Firm—Bacon & Thomas, PLLC

(57) ABSTRACT

A ceiling lamp junction box double-constraint lighting rod mounting structure comprised of sockets installed through openings in the side of a junction box and plug-ended rods inserted into each socket. Each plug-ended rod has catch holes respectively formed in the top surface and two sides of its tip and, correspondingly, a spring and a retaining element are installed at the top ends and the lateral ends of each socket. When the retaining elements are their the normal state, the free ends of the retaining elements are pushed into the bores of the sockets by tensile components. After a plug-ended rod is inserted into the bore of a socket, the catch holes at its tip are respectively infixed by the engaging end of the spring and the free ends of the retaining elements projecting slightly into the bore such that the plug-ended rod is maintained in place by both the spring and the retaining elements and cannot be pulled out while mechanically constrained within the socket. Furthermore, since the junction box and the plug-ended rods can be disassembled and separately set aside, this minimizes overall shipping and storage dimensions. Following purchase, users only have to insert the plug-ended rods into the sockets of the junction box and no additional fasteners or tools are required to thereby facilitate do-it-yourself assembly convenience.

5 Claims, 3 Drawing Sheets

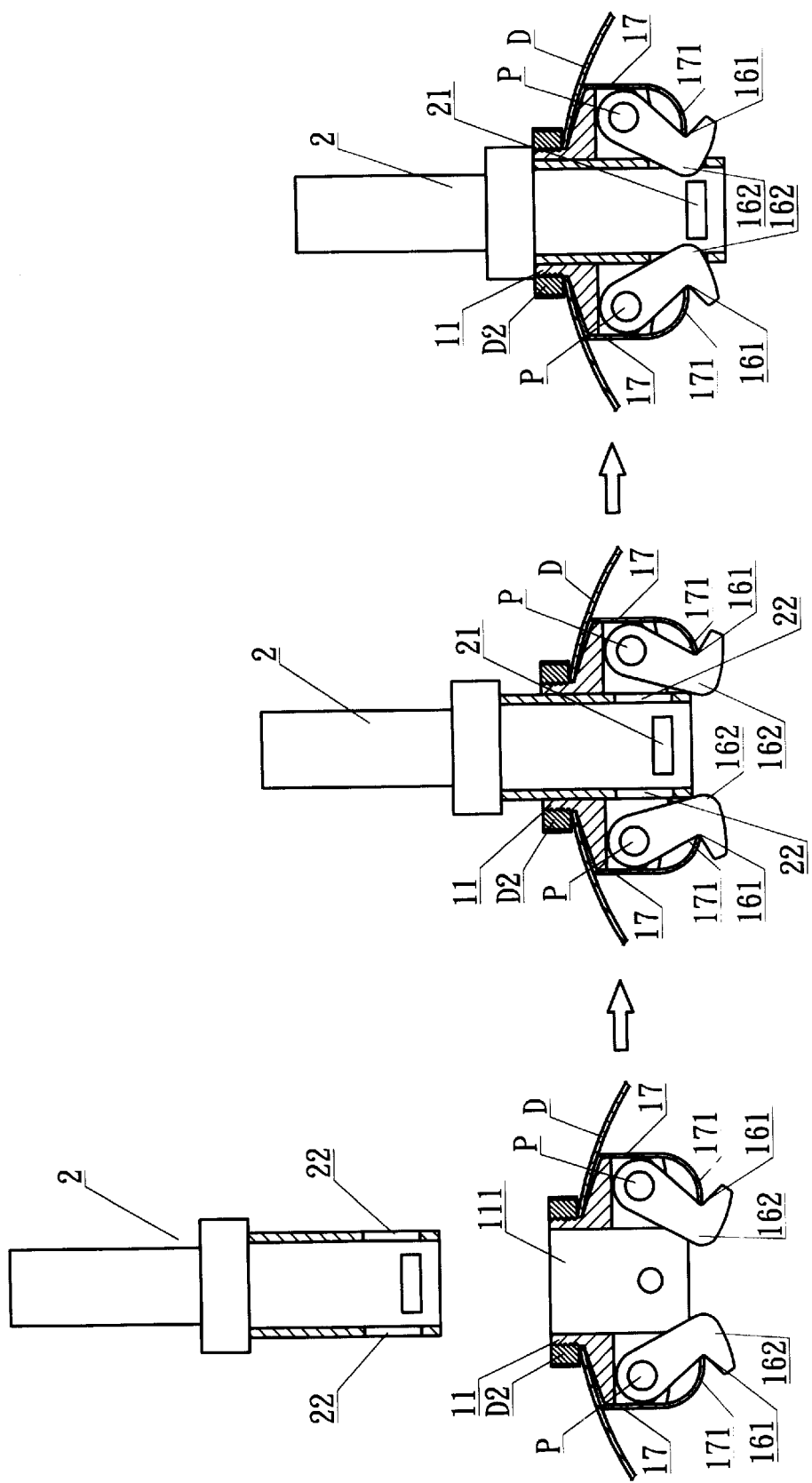

CEILING LAMP JUNCTION BOX DOUBLE-CONSTRAINT LIGHTING ROD MOUNTING STRUCTURE

BACKGROUND OF THE INVENTION

1) Field of the Invention

The invention herein relates to a ceiling lamp junction box double-constraint lighting rod mounting structure, the structural features of which include the respective forming of catch holes in the top surface and the two sides of each plug-ended rod tip and a matching spring and a retaining element respectively installed at the top ends and the lateral ends of each socket; in the normal state, the free ends of the retaining elements are pushed by tensile components and project into the bores of the sockets such that the tips of the inserted plug-ended rods are maintained in place by both the spring and the retaining elements; as such, overall shipping and storage dimensions are minimized and, furthermore, user do-it-yourself convenience is facilitated.

2) Description of the Prior Art

Conventional junction box structures purpose-built for utilization with wall lamps, table lamps, and floor lamps involve fastening by means of screws and nuts; however, the use of such fasteners for assembly and installation not only subjects finished products to damage, but also requires tools (such as wrenches and screwdrivers, etc.) that often cause assembly and installation difficulties; in view of the said drawbacks, the inventor of the invention herein conducted research that culminated in the successful development of the present invention.

SUMMARY OF THE INVENTION

The primary objective of the invention herein is to provide a ceiling lamp junction box double-constraint lighting rod mounting structure, the structural features of which include: each plug-ended rod has catch holes respectively formed in the top surface and two sides of the tip that is inserted into the bore of a socket and, correspondingly, a spring and a retaining element is installed at the top ends and the lateral ends of each socket; with the free ends of the retaining elements in their normal state pushed by tensile components and projecting into the bore of the socket; after a plug-ended rod is inserted, the catch holes at its tip are respectively infixed by the engaging end of the spring and the free ends of the retaining elements slightly projecting into the bore such that the plug-ended rod is maintained in place by both the spring and the retaining elements and cannot be pulled out while mechanically constrained within the socket; as such, the insertion of the plug-ended rods do not require additional fasteners and installation tools, hereby facilitating assembly convenience.

Another objective of the invention herein is to provide a ceiling lamp junction box double-constraint lighting rod mounting structure, wherein the plug-ended rods are removable from the sockets to provide for the packaging, shipping, or storage of the said junction box and since the junction box and the plug-ended rods can be disassembled and separately set aside, this minimizes overall shipping and storage dimensions; furthermore, the plug-ended rod sockets are preassembled in the interior section of the junction box and users purchasing the present invention only have to insert the plug-ended rods into the sockets; no additional fasteners or installation tools are required, thereby facilitating user do-it-yourself assembly convenience.

BRIEF DESCRIPTION OF THE DRAWINGS

FIG. 3-A is a cross-sectional drawing of the invention herein in the normal state.

FIG. 3-B is a cross-sectional drawing of the invention herein illustrating the insertion of the plug-ended rod.

FIG. 3-C is a cross-sectional drawing of the invention after the plug-ended rod is inserted.

DETAILED DESCRIPTION OF THE INVENTION

Figure 1:
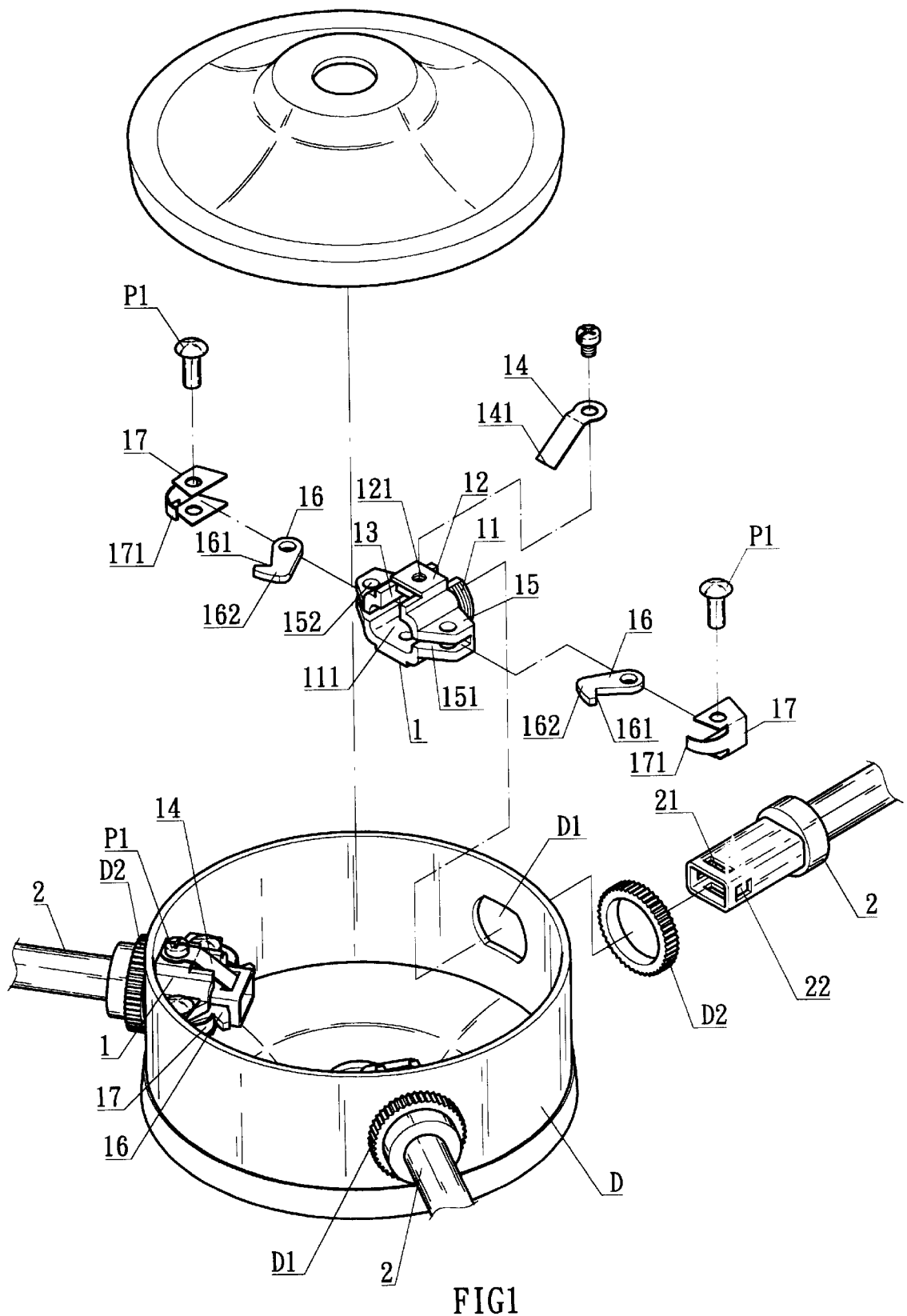
FIG. 1 is an exploded drawing of the invention herein.
Figure 2:
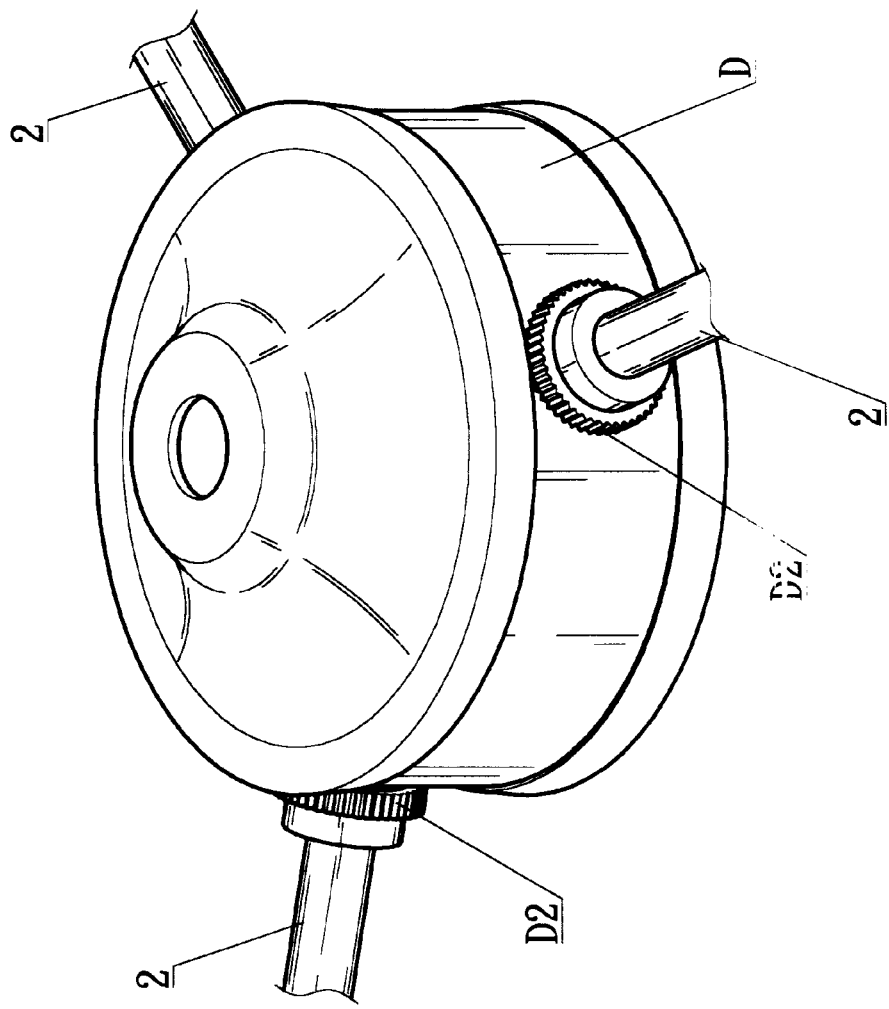
FIG. 2 is an isometric drawing of the invention herein.

Referring to FIG. 1 and FIG. 2, the structural arrangement of the invention herein, the present invention is comprised of sockets 1 installed through openings D1 in the side of a junction box D and plug-ended rods 2 inserted into the interior section of each socket 1, of which:

Each said socket 1 has a laterally extending collar section 11 that is inserted into a junction box D opening D1 and, furthermore, an oblate bore 111 is formed through the interior portion of the collar section 11; a ring nut D2 is fastened around the collar section 11 at the section extending outside the junction box D to mount the socket 1 against the interior side of the junction box D; a platform 12 having a cutaway 13 is disposed at the top surface of the socket 1 inside the junction box B; a hole 121 is formed in the upper extent of the said platform 12 and, furthermore, a spring 14 is fastened to the hole 121, with the said spring 14 having an engaging end 141 curving downward from the fastening point in an slanted arrangement such that the engaging end 141 extends to the upper aspect of the cutaway 13.

Each socket 1 has a lateral appendage 15 extending from each of its two sides and, furthermore, a slotway 151 is disposed along the horizontal centers of each lateral appendage 15 to provide for the insertion of a retaining element 16; a mounting hole 152 is formed in each of the socket 1 lateral appendages 15 and, furthermore, each mounting hole 151 accommodates a pin P1 pivotably conjoining a retaining element 16 and a tensile component 17 such that the point of active linkage P is a fulcrum that allows a certain degree of rotation, wherein:

Each said retaining element 16 has one end hinged to the mounting hole 152 of the socket 1 and the other end is contoured into a follower section 161 that rests against the tensile component 17.

Each said tensile component 17 is a C-shaped member constructed of a thin sheet of material having an impelling end 171 that extends laterally from its center section and is seated against a retaining element 16 follower section 161 such that when the retaining elements 16 are in a normal state, the tensile components 17 push its free ends 162 into the socket 1 slotway 151, with the free ends 162 projecting slightly into the interior section of the socket 1 bore 111.

Each said plug-ended rod 2 is a tubular structure transitioning into a rectangular arrangement at the final section aligned with the junction box D opening D1 and, furthermore, the plug-ended rod 2 has a catch hole 21 and 22 respectively formed in the top surface and two sides of its tip such that after the plug-ended rod 2 is inserted into the socket 1 bore 111, the catch holes 21 and 22 at its top end and lateral end are respectively infixed by the engaging end 141 of the spring 14 and the free ends 162 of the retaining elements 16.

Regarding the operation of the invention herein, referring to FIG. 3, when the said junction box D is in a normal state, the retaining elements 16 of the sockets 1 are pushed by the tensile components 17 and project slightly pass the inner sides of the bores 111 (as shown in FIG. 3-A).

Due to the structural features defining the angled arrangement of the free ends 162 of the retaining elements 16 hinged within the sockets 1 that project into the interior section of the bores 111 and, furthermore, the slanted arrangement of the engaging ends 141 of the springs 14 fastened to the top surfaces of the socket 1 platforms 12 that extend into the cutaways 13 of the platforms 12, when the plug-ended rods 2 are inserted into the bores 111, the two sides at the tip of the plug-ended rods 2 push apart the retainer element 16 free ends 161 and the top surfaces at the tips of the plug-ended rods 2 push against the spring 14 engaging ends 141 (as shown in FIG. 3-B).

Following the insertion of the plug-ended rods 2, the catch holes 21 in the top ends of the plug-ended rods 2 are lodged at the bottom aspect of the spring 14 engaging ends 141 and the catch holes 22 in the two sides of the plug-ended rods 2 are respectively lodged onto the retainer element 16 free ends 161 projecting slightly into the interior section of the socket 1 bore 111; additionally, since the retainer element 16 free ends 161 are impelled into deployment by the tensile components 17, the plug-ended rods 2 are maintained in place by both the spring 14 and the retaining elements 16 and cannot be pulled out while mechanically constrained within the socket 1 (as shown in FIG. 3-C).

The plug-ended rods 2 are removable from the sockets 1 to provide for the packaging, shipping, or storage of the said junction box D and since the junction box D and the plug-ended rods 2 can be disassembled and separately set aside, this minimizes overall shipping and storage dimensions; since the plug-ended rod 2 sockets 1 are preassembled to the interior section of the junction box D, users purchasing the present invention only have to insert the plug-ended rods 2 into the sockets 1 and no additional fasteners or installation tools are required to thereby facilitate user do-it-yourself assembly convenience.

What is claimed is:

1. A ceiling lamp junction box double-constraint lighting rod mounting structure comprised of sockets installed through openings in the side of a junction box and plug-ended rods inserted into the interior section of each said socket, of which:

each said socket has a collar section that is inserted into a said junction box opening, a ring nut is fastened around the said collar section to thereby mount the said socket and, furthermore, an oblate bore is formed through the interior portion of the said collar section; a platform having a cutaway is disposed at the top surface of the said socket in the said junction box and, furthermore, a spring is fastened onto the said platform, with the other end of the said spring being slanted and extending into the said cutaway; each said socket has a retaining element and a tensile component pivotably conjoined by a pin to each of its two sides and when the said retaining elements are in a normal state, the said tensile components push the said free ends of the said retaining elements such that they project slightly into the interior section of the said socket bore, each said plug-ended rod has catch holes respectively formed in the top surface and two sides of its tip such that after the said plug-ended rod is inserted into the said socket bore, the said catch holes at its top end and lateral end are respectively infixed by the engaging end of the said spring and the said free ends of the said retaining elements, as such, overall shipping and storage dimensions are minimized and, furthermore convenient do-it-yourself assembly by the user is effectively facilitated.

2. As mentioned in claim 1 of the ceiling lamp junction box double-constraint lighting rod mounting structure of the invention herein, the said sockets have a slotway disposed in each of their two sides that provides for the insertion of the said retaining elements.

3. As mentioned in claim 1 of the ceiling lamp junction box double-constraint lighting rod mounting structure of the invention herein, each said socket retaining element has one end hinged to a mounting hole of the said socket and the other end is contoured into a follower section that rests against the said tensile component; and each said tensile component is a C-shaped member constructed of a thin sheet of material having an impelling end that extends laterally from its center section and is seated against the said retaining element follower sections.

4. As mentioned in claim 1 of the ceiling lamp junction box double-constraint lighting rod mounting structure of the invention herein, the said free ends of the retaining elements hinged to the said sockets are of an angled arrangement such that they project into the interior section of the said bores and the curved said engaging ends of the said springs fastened to the top surfaces of the said socket platforms are of a slanted arrangement such that they extend into the said cutaways of the said platforms.

5. As mentioned in claim 1 of the ceiling lamp junction box double-constraint lighting rod mounting structure of the invention herein, the said bore of the said collar section can be of a triangular, rectangular, pentagonal, or other polygonal profile structure.

* * * * *